(12) United States Patent
Karasawa et al.

(10) Patent No.: US 11,900,319 B2
(45) Date of Patent: Feb. 13, 2024

(54) INFORMATION PROCESSING DEVICE

(71) Applicant: SEIKO EPSON CORPORATION, Tokyo (JP)

(72) Inventors: Joji Karasawa, Okaya (JP); Tsukasa Kobayashi, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 35 days.

(21) Appl. No.: 17/558,716

(22) Filed: Dec. 22, 2021

(65) Prior Publication Data

US 2022/0207481 A1    Jun. 30, 2022

(30) Foreign Application Priority Data

Dec. 25, 2020    (JP) ................. 2020-216178

(51) Int. Cl.
*G06Q 10/0875* (2023.01)
*G06Q 30/06* (2023.01)
*G06Q 30/0601* (2023.01)

(52) U.S. Cl.
CPC ..... *G06Q 10/0875* (2013.01); *G06Q 30/0643* (2013.01)

(58) Field of Classification Search
None
See application file for complete search history.

(56) References Cited

U.S. PATENT DOCUMENTS

| 9,639,887 | B2* | 5/2017 | McCoy | G06Q 30/0623 |
| 9,811,840 | B2* | 11/2017 | Sinclair | G06Q 30/0639 |
| 11,176,602 | B2* | 11/2021 | Sorensen | G06N 3/044 |
| 2014/0019300 | A1* | 1/2014 | Sinclair | G06Q 30/0641 |
| | | | | 705/26.9 |
| 2015/0310539 | A1* | 10/2015 | McCoy | G06Q 30/0639 |
| | | | | 705/27.1 |
| 2019/0122292 | A1* | 4/2019 | Riggins | G06Q 30/0643 |
| 2020/0043086 | A1* | 2/2020 | Sorensen | G06Q 30/0631 |

FOREIGN PATENT DOCUMENTS

| JP | 2016-009416 | 1/2016 |
| JP | 2018-077666 | 5/2018 |
| JP | 2020-024649 | 2/2020 |

OTHER PUBLICATIONS

Anon., "YCD Multimedia Changes the Rules of in-Store Digital Signage by Introducing a Ground-Breaking New Solution Based on Ritalix[R] Software and HP Hardware—See it at NRF 2011," Business Wire, Jan. 10, 2011. (Year: 2011).*
Marino, G., et al., "Consumer sensitivity to delivery lead time: a furniture retail case," International Journal of Physical Distribution & Logistics Management, 48.6: 610-629. Emerald Group Publishing. (Year: 2018).*

\* cited by examiner

*Primary Examiner* — Nicholas D Rosen
(74) *Attorney, Agent, or Firm* — Dority & Manning, P.A.

(57) ABSTRACT

An information processing device including a processing device is provided. The processing device acquires first information about a stock of a first product in an actual store and second information about a stock of a second product in the store. The processing device creates a display effect to highlight one product of the first product and the second product more than the other product, based on the first information and the second information, using a display effect device creating the display effect in the store.

16 Claims, 2 Drawing Sheets

INFORMATION PROCESSING DEVICE

The present application is based on, and claims priority from JP Application Serial Number 2020-216178, filed Dec. 25, 2020, the disclosure of which is hereby incorporated by reference herein in its entirety.

BACKGROUND

1. Technical Field

The present disclosure relates to an information processing device.

2. Related Art

Recently, a display device such as a projector may be used to create a display effect for a product displayed on a display shelf installed in an actual store of a retailer or the like. JP-A-2018-77666 discloses an information processing system which displays a content relating to a product displayed on a display shelf and a content of a related product related to the above product, on a display device provided at the display shelf, and thus presents very convenient information to the customer and performs an efficient sales promotion for the store.

When a plurality of products are displayed on a display shelf, the seller may want to perform a sales promotion of a particular product, of the plurality of products. Meanwhile, display effects that are not well-balanced, for example, similar display effects created for all of the plurality of products displayed on the display shelf or the like may not be able to arouse customers' appetite for buying the product which the seller wants to promote. However, JP-A-2018-77666 does not describe how a product whose content is to be displayed is decided. Therefore, a technique enabling a display effect that is likely to increase the level of attention paid to a product which the seller wants to promote, when creating display effects for products displayed on a display shelf in an actual store using a display device, is demanded.

SUMMARY

An information processing device according to an aspect of the present disclosure executes: acquiring first information about a stock of a first product displayed in an actual store and second information about a stock of a second product displayed in the store; and creating a display effect to highlight one product of the first product and the second product more than the other product, based on the first information and the second information, using a display effect device creating a display effect for the first product and the second product in the store.

DESCRIPTION OF EXEMPLARY EMBODIMENTS

An embodiment of the present disclosure will now be described with reference to the drawings. The embodiment described below includes various technically preferable limitations. However, the embodiment of the present disclosure is not limited to the configurations described below.

1. Embodiment

Figure 1:
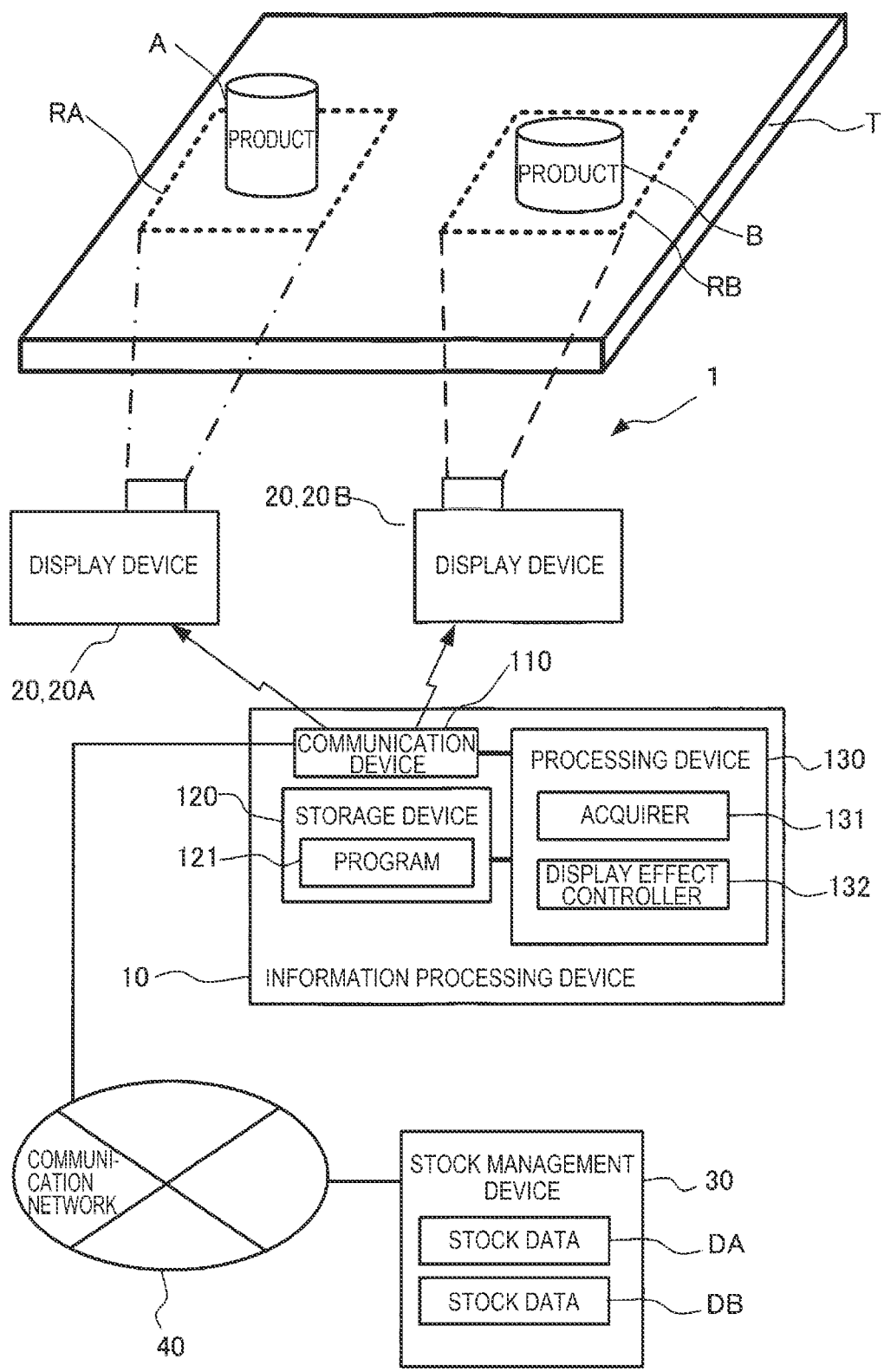
FIG. 1 shows an example of the configuration of a display effect system including an information processing device according to an embodiment of the present disclosure.

FIG. 1 is a schematic view showing an example of a display effect system 1 including an information processing device 10 according to an embodiment of the present disclosure. The display effect system 1 is a system for displaying an image for sales promotion onto a product A and a product B displayed on a display shelf T in an actual store of a retailer or the like. The product A is an example of a first product according to the present disclosure. The product B is an example of a second product according to the present disclosure. As shown in FIG. 1, the display effect system 1 includes a display device 20A, a display device 20B, and a stock management device 30 in addition to the information processing device 10. The display device 20A and the display device 20B are coupled to the information processing device 10 via a communication line. The stock management device 30 is coupled to the information processing device 10 via a communication network 40 such as a LAN (local area network) installed in the store. While the case where the product A and the product B are displayed on the display shelf T is described in this embodiment, the place where the products are displayed may be the floor or wall of the store, a display table, or the like.

The display device 20A and the display device 20B display an image represented by image data provided from the information processing device 10. In this embodiment, the image data provided to the display device 20A from the information processing device 10 represents an image for the sales promotion of the product A. A specific example of the image for the sales promotion of the product A may be a decorative image adding a grace to the appearance of the product A, an image including a character string or the like indicating that the product A is on a special sale, an image including a character string or the like indicating that the product A is a popular product, or the like. In this embodiment, the image data provided to the display device 20B from the information processing device 10 represents an image for the sales promotion of the product B. A specific example of the image for the sales promotion of the product B may be a decorative image adding a grace to the appearance of the product B, an image including a character string or the like indicating that the product B is on a special sale, an image including a character string or the like indicating that the product B is a popular product, or the like.

The display device 20A and the display device 20B are, for example, projectors. In this embodiment, the display device 20A is already adjusted in terms of the position and the direction of the optical axis of projection light or the like so as to project the image for the sales promotion of the product A onto a zone RA that includes the product A and does not include the product B, in the store. As the image for the sales promotion of the product A is displayed in the zone RA including the product A and not including the product B, in the store, customer's attention can be drawn directly to the product A, compared with a case where the image for sales promotion is displayed in a zone where the product A is not displayed, in the store, such as the ceiling, wall or the like of the store. Similarly, the display device 20B is already adjusted in terms of the position and the direction of the optical axis of projection light or the like so as to project the image for the sales promotion of the product B to a zone RB that includes the product B and does not include the product A, in the store. In the description below, the display device 20A and the display device 20B can be simply referred to as a display device 20 when the display device 20A and the display device 20B need not be discriminated from each other. In this embodiment, the display device 20A displaying the image for the sales promotion of the product A and the display device 20B displaying the image for the sales promotion of the product B are separately provided. However, a single display device 20 may display images for the sales promotion of the product A and the product B, respectively.

The stock management device 30 stores stock data DA representing the amount of stock of the product A in association with an identifier univocally identifying the product A. An example of the identifier univocally identifying the product A may be a character string showing the model number of the product A. The stock management device 30 also stores stock data DB representing the amount of stock of the product B in association with an identifier univocally identifying the product B. An example of the identifier univocally identifying the product B may be a character string showing the model number of the product B. The stock data DA is an example of first information about the stock of the product A, which is the first product. The stock data DB is an example of second information about the stock of the product B, which is the second product. The stock management device 30 in the embodiment is, for example, a hard disk where data can be read out and written via a network. The stock data DA and the stock data DB stored in the stock management device 30 are updated, for example, by an access from a sales management system such as a POS (point of sales) system. Also, the stock data DA and the stock data DB stored in the stock management device 30 are read out by an access from the information processing device 10. The information processing device 10 reads out the stock data DA and the stock data DB from the stock management device 30 via the communication network 40 and thus acquires the stock data DA and the stock data DB.

The information processing device 10 is a device controlling the display by the display device 20 of the image for the sales promotion of each of the product A and the product B, based on the stock data DA and the stock data DB acquired from the stock management device 30. The information processing device 10 is, for example, a personal computer. As shown in FIG. 1, the information processing device 10 has a communication device 110, a storage device 120, and a processing device 130.

The communication device 110 is coupled to the communication network 40. The communication device 110 is, for example, an NIC (network interface controller). The communication device 110 acquires the stock data DA and the stock data DB from the stock management device 30, under the control of the processing device 130. Also, the display device 20 is coupled to the communication device 110 via a communication line. The communication device 110 transmits image data representing an image to be projected onto the product A, to the display device 20A, under the control of the processing device 130. The communication device 110 transmits image data representing an image to be projected onto the product B, to the display device 20B, under the control of the processing device 130.

The storage device 120 is a recording medium readable by the processing device 130. The storage device 120 includes, for example, a non-volatile memory and a volatile memory. The non-volatile memory is, for example, a ROM (read-only memory), an EPROM (erasable programmable read-only memory) or an EEPROM (electrically erasable programmable read-only memory). The volatile memory is, for example, a RAM (random-access memory).

In the non-volatile memory of the storage device 120, the image data representing the image for the sales promotion of the product A and the image data representing the image for the sales promotion of the product B are stored in advance. Also, in the non-volatile memory of the storage device 120, a program 121 executed by the processing device 130 is stored in advance. The volatile memory of the storage device 120 is used by the processing device 130 as a work area for executing the program 121. The program 121 may also be referred to as an "application program", "application software" or "app". The program 121 is, for example, acquired from a server or the like, not illustrated, via the communication device 110 and subsequently stored in the storage device 120. Also, the image data representing the image for the sales promotion of the product A and the image data representing the image for the sales promotion of the product B are, for example, acquired from a server or the like, not illustrated, via the communication device 110 and subsequently stored in the storage device 120.

The processing device 130 includes, for example, a processor such as a CPU (central processing unit), that is, a computer. The processing device 130 may be formed of a single computer or a plurality of computers. The processing device 130 reads out the program 121 from the non-volatile memory to the volatile memory in response to an operation giving an instruction to start executing the program 121, to an input device, not illustrated. The processing device 130 executes the program 121 read out in the volatile memory. The processing device 130 operating according to the program 121 functions as an acquirer 131 and a display effect controller 132 shown in FIG. 1. The acquirer 131 and the display effect controller 132 shown in FIG. 1 are software modules implemented by causing the processing device 130 to operate according to the program 121. The functions of each of the acquirer 131 and the display effect controller 132 are as described below.

The acquirer 131 acquires the stock data DA and the stock data DB from the stock management device 30 via the communication device 110 and the communication network 40. That is, the acquirer 131 acquires the first information about the stock of the first product displayed in the store where the display device 20A and the display device 20B are installed and the second information about the stock of the second product displayed in the same store.

The display effect controller 132 controls the image displayed in the zone RA by the display device 20A according to the amount of stock of the product A represented by the stock data DA. The display effect controller 132 also controls the image displayed in the zone RB by the display device 20B according to the amount of stock of the product B represented by the stock data DB. By controlling the image displayed in the zone RA by the display device 20A and the image displayed in the zone RB by the display device 20B, the display effect controller 132 creates a display effect to highlight one product of the product A and the product B more than the other product.

To explain this more in detail, the display effect controller 132 first decides one of the product A and the product B as the one product to be highlighted more than the other product, based on the stock data DA and the stock data DB acquired by the acquirer 131. As specific examples of the method for deciding the one product to be highlighted more than the other product, a first configuration, a second configuration, and a third configuration, described below, may be employed.

The first configuration is a configuration where the product A is defined as the one product and the product B is defined as the other product when the value represented by the stock data DA is higher than the value represented by the stock data DB, that is, when the amount of stock of the product A is greater than the amount of stock of the product B. In this embodiment, this first configuration is employed. In the first configuration, since the product A stocked in a larger amount than the product B is highlighted, the level of attention paid by customers to the product A can be made higher than the level of attention paid by customers to the product B. As the level of attention paid to the product A is made higher than the level of attention paid to the product B, customers' appetite to buy the product A can be aroused more intensely than for the product B and an increase in the amount of sales of the product A, that is, a reduction in the amount of stock of the product A, can be expected. Meanwhile, when value represented by the stock data DB is higher than the value represented by the stock data DA, the display effect controller 132 defines the product B as the one product and defines the product A as the other product. When the value represented by the stock data DA and the value represented by the stock data DB are equal, the display effect controller 132 creates similar display effects for the two products without highlighting the one product of the product A and the product B more than the other product.

As a method for deciding the one product to be highlighted more than the other product, the second configuration or the third configuration described below may be employed instead of the first configuration. The second configuration is a configuration where the product A is defined as the one product and the product B is defined as the other product when the value represented by the stock data DA is higher than the value represented by the stock data DB by a predetermined amount or more, that is, when the amount of stock of the product A is greater than the amount of stock of the product B by a predetermined amount or more. In the second configuration, since the product A stocked in a larger amount than the product B by a predetermined number or more is highlighted, the level of attention paid by customers to the product A can be made higher than the level of attention paid by customers to the product B. In the second configuration, too, customers' appetite to buy the product A can be aroused more intensely than for the product B and a reduction in the amount of stock of the product A can be expected. Meanwhile, when value represented by the stock data DB is higher than the value represented by the stock data DA by a predetermined number or more, the display effect controller 132 defines the product B as the one product and defines the product A as the other product. When the absolute value of the difference between the value represented by the stock data DA and the value represented by the stock data DB is less than the predetermined number, the display effect controller 132 creates similar display effects for the two products without highlighting the one product of the product A and the product B more than the other product.

The third configuration is a configuration where the product A is defined as the one product and the product B is defined as the other product when the value represented by the stock data DA is 1 or higher and is lower than the value represented by the stock data DB. That the value represented by the stock data DA is 1 or higher means that the product A is in stock. That the value represented by the stock data DA is lower than the value represented by the stock data DB means that the amount of stock of the product A is less than the amount of stock of the product B. That is, the third configuration is a configuration where the product A is defined as the one product and the product B is defined as the other product, when the product A is in stock and the amount of stock of the product A is less than the amount of stock of the product B. In the third configuration, the product A, which is in stock and is stocked in a smaller amount than the product B, that is, the product A, which is in stock and is considered to be selling better than the product B, is highlighted. Thus, customers' appetite to buy the product A can be aroused more intensely and a further expansion of sales of the product A can be expected. Meanwhile, when value represented by the stock data DB is 1 or higher and is lower than the value represented by the stock data DA, the display effect controller 132 defines the product B as the one product and defines the product A as the other product. When the value represented by the stock data DA and the value represented by the stock data DB are equal, the display effect controller 132 creates similar display effects for the two products without highlighting the one product of the product A and the product B more than the other product.

As specific configurations for creating a display effect to highlight the one product more than the other product, a fourth configuration, a fifth configuration, and a sixth configuration, described below, may be employed.

Figure 2:
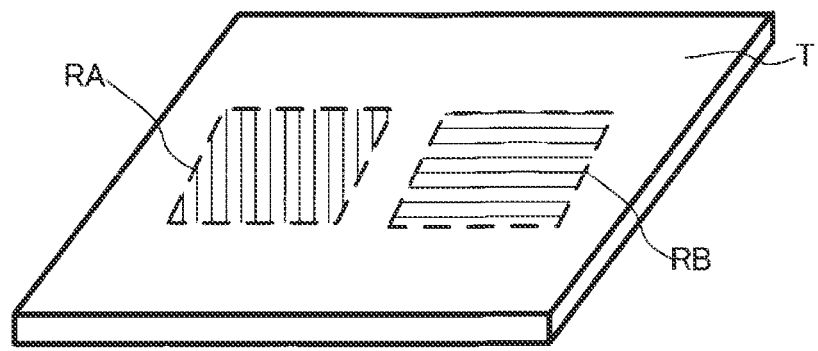
FIG. 2 explains the highlighting of one product according to a fourth configuration.

The fourth configuration is a configuration where the illuminance of image light cast on the one product is made higher than the illuminance of image light cast on the other product. In this embodiment, the fourth configuration is employed as a specific configuration for creating a display effect to highlight the one product more than the other product. For example, when the one product is the product A and the other product is the product B, the display effect controller 132 controls the display device 20A and the display device 20B in such a way that the illuminance of the image light cast on the zone RA is higher than the illuminance of the image light cast on the zone RB, as shown in FIG. 2. In FIG. 2, the illuminance of the image light cast on each of the zone RA and the zone RB is indicated by hatching. In the example shown in FIG. 2, the vertical hatching indicates the image light cast with a higher illuminance than at the horizontal hatching. When the one product is the product A and the other product is the product B, the zone RA is an example of a zone that includes the one product and does not include the other product, in the store. When the one product is the product A and the other product is the product B, the image light cast on the zone RA from the display device 20A is an example of first light according to the present disclosure. The image light cast on the zone RB from the display device 20B is an example of second light.

Figure 3:
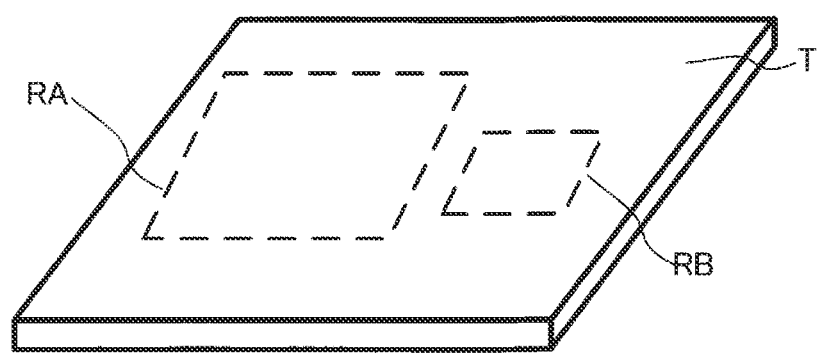
FIG. 3 explains the highlighting of one product according to a fifth configuration.

As a specific configuration for creating a display effect to highlight the one product more than the other product, the fifth configuration or the sixth configuration described below may be employed instead of the fourth configuration. The fifth configuration is a configuration where the area of the zone where the first light is cast is made larger than the area of the zone where the second light is cast. For example, when the one product is the product A and the other product is the product B, the display effect controller 132 controls the display device 20A and the display device 20B in such a way that the area of the zone RA is larger than the area of the zone RB, as shown in FIG. 3. When the one product is the product A and the other product is the product B, the zone RA is an example of a first zone according to the present disclosure. The zone RB is an example of a second zone according to the present disclosure.

The sixth configuration is a combination of the fourth configuration and the fifth configuration. That is, in the sixth configuration, the area of the zone where the first light is cast is made larger than the area of the zone where the second light is cast, and the illuminance of the first light is made higher than the illuminance of the second light.

Figure 4:
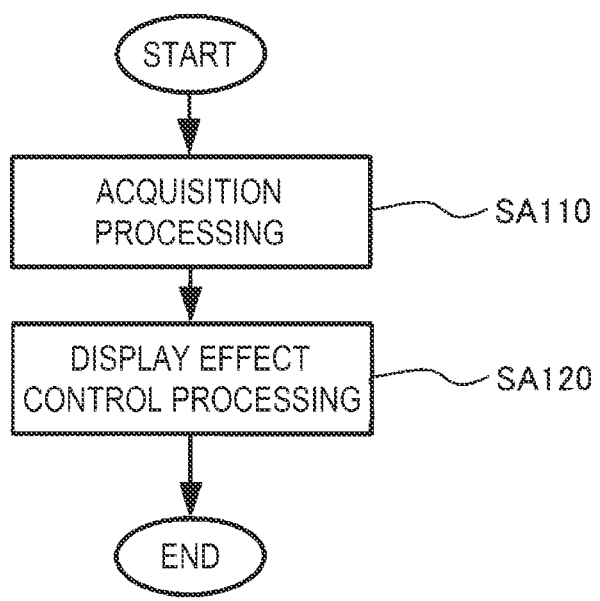
FIG. 4 is a flowchart showing a flow of display effect processing executed by the information processing device.

The processing device 130 operating according to the program 121 executes display effect processing shown in FIG. 4 periodically at a predetermined time interval. As shown in FIG. 4, the display effect processing includes acquisition processing SA110 and display effect control processing SA120.

In the acquisition processing SA110, the processing device 130 functions as the acquirer 131. In the acquisition processing SA110, the processing device 130 acquires the stock data DA and the stock data DB from the stock management device 30 via the communication device 110 and the communication network 40.

In the display effect control processing SA120, the processing device 130 functions as the display effect controller 132. In the display effect control processing SA120, the processing device 130 controls the image displayed on the product A by the display device 20A according to the amount of stock of the product A represented by the stock data DA and controls the image displayed on the product B by the display device 20B according to the amount of stock of the product B represented by the stock data DB, and thus creates a display effect to highlight the one product more than the other product.

In this embodiment, the foregoing first configuration is employed to decide which one of the product A and the product B is the one product. Therefore, when the value represented by the stock data DA acquired in the acquisition processing SA110 is higher than the value represented by the stock data DB acquired in the acquisition processing SA110, the processing device 130 in the display effect control processing SA120 defines the product A as the one product and the product B as the other product and creates a display effect to highlight the one product more than the other product.

In this embodiment, the foregoing fourth configuration is employed as the specific configuration for creating a display effect to highlight the one product more than the other product. Therefore, in the display effect control processing SA120, the processing device 130 makes the illuminance of the image light cast on the zone RA from the display device 20A higher than the illuminance of the image light cast on the zone RB from the display device 20B. The image light with a higher illuminance than the image light cast on the product B is cast on the product A. Thus, the product A can be highlighted more than the product B.

In this way, when the amount of stock of the product A is greater than the amount of stock of the product B, the information processing device 10 in this embodiment creates a display effect to highlight the product A more than the product B. Since the display effect to highlight the product A more than the product B is created, the level of attention paid to the product A by customers can be made higher than the level of attention paid to the product B and customers' appetite to buy the product A can be aroused more intensely than for the product B. Thus, a reduction in the amount of stock of the product A can be expected.

2. Modifications

The embodiment can be modified in the following manners.

(1) The information processing device 10 may execute detection processing of detecting the display position of the product A and the display position of the product B. Specifically, an image pickup device picking up an image of the display shelf T may be coupled to the communication device 110, and the processing device 130 may analyze the picked-up image picked up by the image pickup device, thus detecting the display position of the product A and the display position of the product B. Also, a wireless communication tag such as an RFID (radio-frequency identification) tag may be attached to each of the product A and the product B, and the communication device 110 of the information processing device 10 may include a communication circuit communicating with the wireless communication tag. In the detection processing in this configuration, the processing device 130 detects the display position of the product with the wireless communication tag attached, based on the electric field intensity of an electrical wave transmitted from the wireless communication tag and the direction from which the electrical wave arrives. In the configuration where the information processing device 10 executes the detection processing of detecting the display position of the product, the processing device 130 of the information processing device 10 may also execute decision processing of deciding a zone where a display effect to highlight one product is created, based on the detected display position of the product A and the detected display position of the product B. A specific example of the decision processing may be a configuration where a zone within a circle with a predetermined radius from the display position detected in the detection processing is decided as the zone where the display effect to highlight one product is to be created. The radius of the circle may be set to a value less than half the distance between the display positions of the products arranged next to each other.

(2) The information processing device 10 in the embodiment may be a tablet terminal or a smartphone. The information processing device 10 in the embodiment may be manufactured or sold as a stand-alone device. While the display effect system 1 according to the embodiment has the display device 20 separately from the information processing device 10, the display device 20 and the information processing device 10 may be integrated together as a single device. While the display effect system 1 according to the embodiment has the stock management device 30 separately from the information processing device 10, the storage device 120 of the information processing device 10 may also play the role of the stock management device 30. While the display device 20A in the embodiment is a projector, the display device 20A may be an illuminating device casting illuminating light onto the zone RA. Similarly, the display device 20B may be an illuminating device casting illuminating light onto the zone RB. Even when the display device 20 is an illuminating device, a display effect to highlight one product more than the other product can be created by causing the illuminance of the illuminating light cast onto the one product to be higher than the illuminance of the illuminating light cast onto the other product or by causing the area of the zone where the illuminating light is cast from one of the display device 20A and the display device 20B to be greater than the area of the zone where the illuminating light is cast from the other display device.

(3) In the embodiment, the program 121 is already stored in the storage device 120. However, the program 121 may be manufactured or distributed as a single product. A specific method for distributing the program 121 may be a configuration where the program 121 is written in a computer-readable recording medium such as a flash ROM (read-only memory) and thus distributed, or a configuration where the program 121 is downloaded and thus distributed via a telecommunication network such as the internet.

(4) While the acquirer 131 and the display effect controller 132 in the embodiment are software modules, a part or the entirety of the acquirer 131 and the display effect controller 132 may be hardware. An example of this hardware may be a DSP (digital signal processor), an ASIC (application-specific integrated circuit), a PLD (programmable logic device), and an FPGA (field-programmable gate array). Even when a part or the entirety of the acquirer 131 and the display effect controller 132 is hardware, the same effects as in the embodiment can be achieved.

(5) In the embodiment, a display effect to highlight one of two types of products, the product A and the product B, is created. However, three or more types of products may be employed. In this case, a display effect to highlight one or more products more than one or more other products is created, based on the stock information about each of the three or more types of products. When the display effect to highlight one or more products is created, one of the one or more products is equivalent to the one product, and one of the one or more products that are not highlighted is equivalent to the other product. In order to attract customers' attention, the number of highlighted products may be preferably less than half the number of candidate products.

3. Aspects Grasped from at Least One of Embodiment and Modification Examples

The present disclosure is not limited to the foregoing embodiment and modification examples and can be implemented according to various aspects without departing from the spirit and scope of the present disclosure. For example, the present disclosure can be implemented according to the aspects described below. A technical feature in the embodiment corresponding to a technical feature in each of the aspects described below can be suitably replaced or combined in order to solve a part or all of the problems of the present disclosure or in order to achieve a part or all of the effects of the present disclosure. Also, the technical feature can be suitably deleted unless described as essential in the specification.

The information processing device 10 according to an aspect of the present disclosure executes the acquisition processing SA110 and the display effect control processing SA120 described below. In the acquisition processing SA110, the information processing device 10 acquires the first information about the stock of the first product displayed on the display shelf T in the actual store and the second information about the stock of the second product displayed on the display shelf T. In the display effect control processing SA120, the information processing device 10 creates a display effect to highlight one product of the first product and the second product more than the other product, based on the first information and the second information, using a display effect device creating a display effect for the first product and the second product in the store. The display device 20A and the display device 20B are an example of the display effect device. According to this aspect, the display effect to highlight the one product of the first product and the second product more than the other product is created, based on the amount of stock of each of the first product and the second product. Therefore, customers' appetite to buy the one product can be aroused more intensely than for the other product.

According to another aspect, the display effect control processing SA120 executed by the information processing device 10 may include creating the display effect to highlight the one product in a zone that includes the one product and does not include the other product, of the zones in the store. According to this aspect, the display effect to highlight the one product can be created in the zone that includes the one product and does not include the other product, in the store. According to this aspect, for example, when the product is not displayed on the ceiling or wall of the store, customers' attention can be drawn directly to the product, compared with a configuration where an image for sales promotion is displayed in the zone where the product is not displayed.

According to another aspect, the information processing device 10 may execute the detection processing and the decision processing described below, before the display effect control processing SA120. In the detection processing, the information processing device 10 detects the display position of the first product and the display position of the second product in the store. In the decision processing, the information processing device 10 decides the zone where the display effect to highlight the one product is created, that is, the zone that includes the one product of the first product and the second product and does not include the other product of the first product and the second product, of the zones in the store, based on the display position of the first product and the display position of the second product detected in the detection processing. According to this aspect, the display position of the first product and the display position of the second product in the store are detected, and the zone where the display effect to highlight the one product is decided, based on the each of the detected display positions. Therefore, even when the display position of at least one of the first product and the second product is changed, the display effect to highlight the one product can be created, adapting to the changed display position.

According to another aspect, the information processing device 10 may define the first product as the one product and define the second product as the other product when the first information and the second information indicate that the amount of stock of the first product is larger than the amount of stock of the second product. According to this aspect, the display effect to highlight the product stocked in a larger amount, of the first product and the second product, is created. Therefore, a reduction in the amount of stock of the product stocked in a larger amount can be expected.

According to another aspect, the information processing device 10 may define the first product as the one product and define the second product as the other product when the first information and the second information indicate that the amount of stock of the first product is larger than the amount of stock of the second product by a predetermined amount or more. According to this aspect, the display effect to highlight the product stocked in a larger amount by a predetermined amount or more, of the first product and the second product, is created. Therefore, a reduction in the amount of stock of the product stocked in a larger amount can be expected.

According to another aspect, the information processing device 10 may define the first product as the one product and define the second product as the other product when the first information and the second information indicate that the first product is in stock and that the amount of stock of the first product is less than the amount of stock of the second product. According to this aspect, the display effect to highlight the product that is stocked in a smaller amount than the other product, of the first product and the second product, but is still in stock, is created. Therefore, a further expansion of sales of the product stocked in a smaller amount than the other product but still in stock can be expected.

According to another aspect, the display effect for the first product and the second product created in the display effect control processing SA120 by the information processing device 10 may include highlighting the one product more than the other product by at least one of causing the illuminance of the first light cast onto the one product to be higher than the illuminance of the second light cast onto the other product and causing the area of the first zone where the first light is cast to be greater than the area of the second zone where the second light is cast. According to this aspect, the display effect to highlight the one product more than the other product can be created, by adjusting at least either the illuminance of the first light and the illuminance of the second light or the area of the first zone and the area of the second zone.

What is claimed is:

1. An information processing device comprising:
a processing device that executes:
acquiring first information about a stock of a first product displayed in an actual store and second information about a stock of a second product displayed in the store;
creating a display effect to highlight one product of the first product and the second product more than the other product, based on the first information and the second information, using a plurality of display effect devices creating the display effect in the store; and
a communication device that controls the plurality of display effect devices, wherein the communication device couples to the plurality of display effect devices, the plurality of display effect devices comprises a first display effect device and a second display effect device, the first display effect device displays the display effect for the first product, and the second display effect device displays the display effect for the second product.

2. The information processing device according to claim 1, wherein
the creating the display effect includes creating the display effect to highlight the one product in a zone in the store, wherein the zone includes the one product and does not include the other product.

3. The information processing device according to claim 2, wherein the processing device further executes:
detecting a display position of the first product and a display position of the second product in the store, and
determining the zone, based on the display position of the first product and the display position of the second product.

4. The information processing device according to claim 1, wherein
when the first information and the second information indicate that an amount of the stock of the first product is larger than an amount of the stock of the second product, the one product is the first product and the other product is the second product.

5. The information processing device according to claim 1, wherein
when the first information and the second information indicate that an amount of the stock of the first product is larger than an amount of the stock of the second product by a predetermined amount or more, the one product is the first product and the other product is the second product.

6. The information processing device according to claim 1, wherein
when the first information and the second information indicate that when the first product is in stock and that an amount of the stock of the first product is less than an amount of the stock of the second product, the one product is the first product and the other product is the second product.

7. The information processing device according to claim 1, wherein
the creating the display effect includes highlighting the one product more than the other product by at least one of (1) causing an illuminance of first light cast onto the one product to be higher than an illuminance of second light cast onto the other product and (2) causing an area of a first zone where the first light is cast to be greater than an area of a second zone where the second light is cast.

8. An information processing device comprising:
a processing device that executes:
acquiring first information about a stock of a first product displayed in an actual store and second information about a stock of a second product displayed in the store; and
creating a display effect to highlight one product of the first product and the second product more than the other product, based on the first information and the second information, using a display effect device creating the display effect in the store, wherein when the first information and the second information indicate that an amount of the stock of the first product is larger than an amount of the stock of the second product, the one product is the first product and the other product is the second product.

9. The information processing device according to claim 8, wherein
the creating the display effect includes creating the display effect to highlight the one product in a zone in the store, wherein the zone includes the one product and does not include the other product.

10. The information processing device according to claim 9, wherein the processing device further executes:
detecting a display position of the first product and a display position of the second product in the store, and
determining the zone, based on the display position of the first product and the display position of the second product.

11. The information processing device according to claim 8, wherein
when the first information and the second information indicate that an amount of the stock of the first product is larger than an amount of the stock of the second product by a predetermined amount or more, the one product is the first product and the other product is the second product.

12. The information processing device according to claim 8, wherein
the creating the display effect includes highlighting the one product more than the other product by at least one of (1) causing an illuminance of first light cast onto the one product to be higher than an illuminance of second light cast onto the other product and (2) causing an area of a first zone where the first light is cast to be greater than an area of a second zone where the second light is cast.

13. An information processing device comprising:
a processing device that executes:
acquiring first information about a stock of a first product displayed in an actual store and second information about a stock of a second product displayed in the store; and
creating a display effect to highlight one product of the first product and the second product more than the other product, based on the first information and the second information, using a display effect device creating the display effect in the store, wherein when the first information and the second information indicate that the first product is in stock and that an amount of the stock of the first product is less than an amount of the stock of the second product, the one product is the first product and the other product is the second product.

14. The information processing device according to claim 13, wherein
the creating the display effect includes creating the display effect to highlight the one product in a zone in the store, wherein the zone includes the one product and does not include the other product.

15. The information processing device according to claim 14, wherein the processing device further executes:
detecting a display position of the first product and a display position of the second product in the store, and
determining the zone, based on the display position of the first product and the display position of the second product.

16. The information processing device according to claim 13, wherein
the creating the display effect includes highlighting the one product more than the other product by at least one of (1) causing an illuminance of first light cast onto the one product to be higher than an illuminance of second light cast onto the other product and (2) causing an area of a first zone where the first light is cast to be greater than an area of a second zone where the second light is cast.

* * * * *